United States Patent [19]
Jackson et al.

[11] Patent Number: 5,761,918
[45] Date of Patent: Jun. 9, 1998

[54] INTEGRATED CONTROLLER FOR COMMERCIAL VEHICLE AIR CONDITIONING SYSTEM

[75] Inventors: Robert J. Jackson, Monroe; Robert L. Champoux, Redmond, both of Wash.

[73] Assignee: Index Sensors and Controls, Inc., Redmond, Wash.

[21] Appl. No.: 432,045

[22] Filed: May 1, 1995

Related U.S. Application Data

[63] Continuation of Ser. No. 358,070, May 1, 1995, abandoned.
[51] Int. Cl.$^6$ .................... F25D 17/00; F25B 1/00
[52] U.S. Cl. .................. 62/181; 62/228.3; 62/323.4
[58] Field of Search .................. 62/228.3, 323.4, 62/181, 203

[56] References Cited

U.S. PATENT DOCUMENTS

| | | | |
|---|---|---|---|
| 3,633,376 | 1/1972 | Miner | 62/181 |
| 4,048,455 | 9/1977 | Forsythe et al. | 200/81.4 |
| 4,408,466 | 10/1983 | Brown | 62/208 |
| 4,462,541 | 7/1984 | Hansen | 237/2 A |
| 4,471,632 | 9/1984 | Nishi et al. | 62/208 |
| 4,493,957 | 1/1985 | Watters | 200/81 R |
| 4,561,261 | 12/1985 | Kornrumpf et al. | 62/126 |
| 4,612,775 | 9/1986 | Branz et al. | 62/126 |
| 4,757,693 | 7/1988 | Charriau et al. | 62/126 |
| 4,790,143 | 12/1988 | Hanson | 62/126 |
| 4,939,909 | 7/1990 | Tsuchiyama et al. | 62/158 |
| 4,949,550 | 8/1990 | Hanson | 62/126 |
| 4,966,013 | 10/1990 | Wood | 62/193 |
| 5,101,639 | 4/1992 | Wruck et al. | 62/80 |
| 5,156,204 | 10/1992 | Doi | 165/17 |
| 5,209,076 | 5/1993 | Kauffman et al. | 62/228.3 X |
| 5,218,837 | 6/1993 | Moore | 62/228.3 |
| 5,490,556 | 2/1996 | Pichotta | 62/228.3 X |

*Primary Examiner*—William E. Wayner
*Attorney, Agent, or Firm*—Dellett and Walters Stoel Rives LLP

[57] ABSTRACT

An Integrated controller for a commercial vehicle air conditioning system according to the present invention includes a central control unit in communication with a high-pressure switch or sensor, a low-pressure switch or sensor, and an evaporator thermostat. The central control unit includes outputs that control the air conditioning system compressor and fan according to the conditions detected by the high pressure switcher sensor, the low pressure switch or sensor, and the evaporator thermostat.

39 Claims, 4 Drawing Sheets

INTEGRATED CONTROLLER FOR COMMERCIAL VEHICLE AIR CONDITIONING SYSTEM

This application is a continuation of Ser. No. 08/358,070, filed May 1, 1995, now abandoned.

TECHNICAL FIELD

The present invention relates to commercial vehicle air conditioning systems and, in particular, to a system controller that controls operation of a commercial vehicle air conditioning system to enhance operation and prevent damage from malfunctions.

BACKGROUND OF THE INVENTION

Commercial vehicles are typically subjected to heavy usage under a wide variety of conditions and include trucks, semi-truck tractors, buses, and various off-road commercial vehicles used in agriculture, mining, construction, and other industries. Many commercial vehicles include air conditioning systems for the operator compartment to help maintain operator efficiency and alertness, particularly under climatic conditions that would otherwise be unacceptable to operators.

Failure of the air conditioning system in a commercial vehicle can result in decreased operator efficiency or alertness or removal of the vehicle from service so that the air conditioning system can be repaired. Increased reliability of commercial vehicle air conditioning systems can significantly enhance utilization of commercial vehicles and reduce the expense of repairs.

FIG. 1 is a simplified block diagram of a conventional commercial vehicle air conditioning system 10. A compressor 12 pumps under relatively high pressure and temperature a refrigerant gas toward a condenser 14 that dissipates heat in the refrigerant gas and converts it to liquid phase. The low-temperature liquid refrigerant passes through a first control valve 16 (e.g., a thermostatic expansion valve) that controls the flow of refrigerant to an evaporator 18 that cools, dries, and typically cleans the air entering the operator compartment (not shown). Low pressure, low temperature refrigerant gas passes from evaporator 18 through a second control valve 20 (e.g., a suction throttling valve) to return to compressor 12.

Air conditioning system 10 would typically include a high pressure switch 22 and a low pressure switch 24 that function separately to interrupt air conditioning system 10 whenever they sense pressures that are greater than or less than predetermined values, respectively. A disadvantage of the independent operation of pressure switches 22 and 24 in a conventional control system is that the predetermined pressures at which interruption occurs must be relatively extreme to allow for normal variability in system operation. As a consequence, such a control system can prevent catastrophic damage of components in air conditioning system 10 while sometimes allowing major components to be damaged excessively.

For example, operation of air conditioning system 10 with a partial charge of refrigerant that does not trigger low pressure switch 24 can cause lubricant starvation of compressor 12, overheating of compressor 12 due to rapid cycling, seal failure, and damaged hoses and fittings due to excessive operating temperatures. Operation of air conditioning system 10 at high refrigerant charges that do not trigger high pressure switch 22 can severely stress all of air conditioning system 10 and cause hose and fitting leaks. A low system voltage can cause the clutch of compressor 12 to slip and overheat, and loose electrical connections can cause erratic cycling of compressor 12 leading to clutch failure.

SUMMARY OF THE INVENTION

An object of the present invention is, therefore, to provide an integrated controller for commercial vehicle air conditioning systems.

Another object of this invention is to provide such an integrated controller that improves the reliability and maintainability of commercial vehicle air conditioning systems.

A further object of this invention is to provide such an integrated controller that provides enhanced detection and identification of malfunctions in commercial vehicle air conditioning systems.

In a preferred embodiment, an integrated controller for a commercial vehicle air conditioning system according to the present invention includes a central control unit in communication with a high-pressure switch or sensor, a low-pressure switch or sensor, and an evaporator thermostat. The central control unit includes outputs that control the air conditioning system compressor and fan according to the conditions detected by the high pressure switcher sensor, the low pressure switch or sensor, and the evaporator thermostat. In addition, the central control unit includes a display that identifies predetermined system faults or status conditions.

The integrated controller of the present invention is capable of early identification of various air conditioning system faults that typically are not distinguishable with a conventional independent air conditioning system control components. For example, an integrated controller of this invention is capable of identifying and distinguishing a static low refrigerant pressure that corresponds to a full loss of refrigerant charge, a dynamic low refrigerant pressure that corresponds to a partial loss of refrigerant charge, high pressure that corresponds to a refrigerant overcharge, an open clutch condition corresponding to an open compressor clutch power circuit, a shorted clutch condition corresponding to a shorted compressor clutch power circuit, a low battery voltage condition, and open circuit conditions in the high and low pressure switches or sensors. In addition, each of these separate faults can be identified by the control unit display to simplify repair of the air conditioning system.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
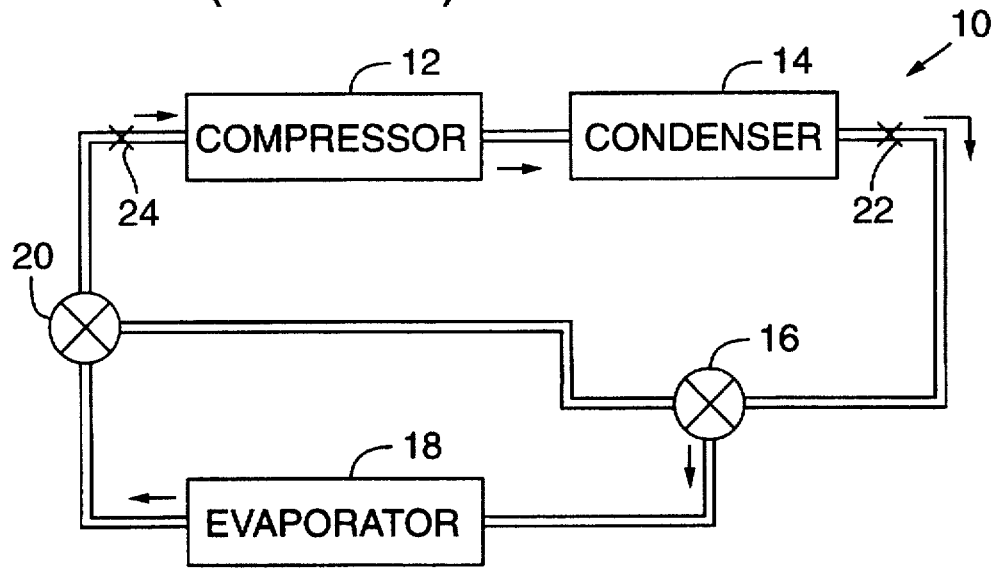
FIG. 1 is a simplified block diagram of a commercial vehicle air conditioning system with conventional independent control components.
Figure 2:
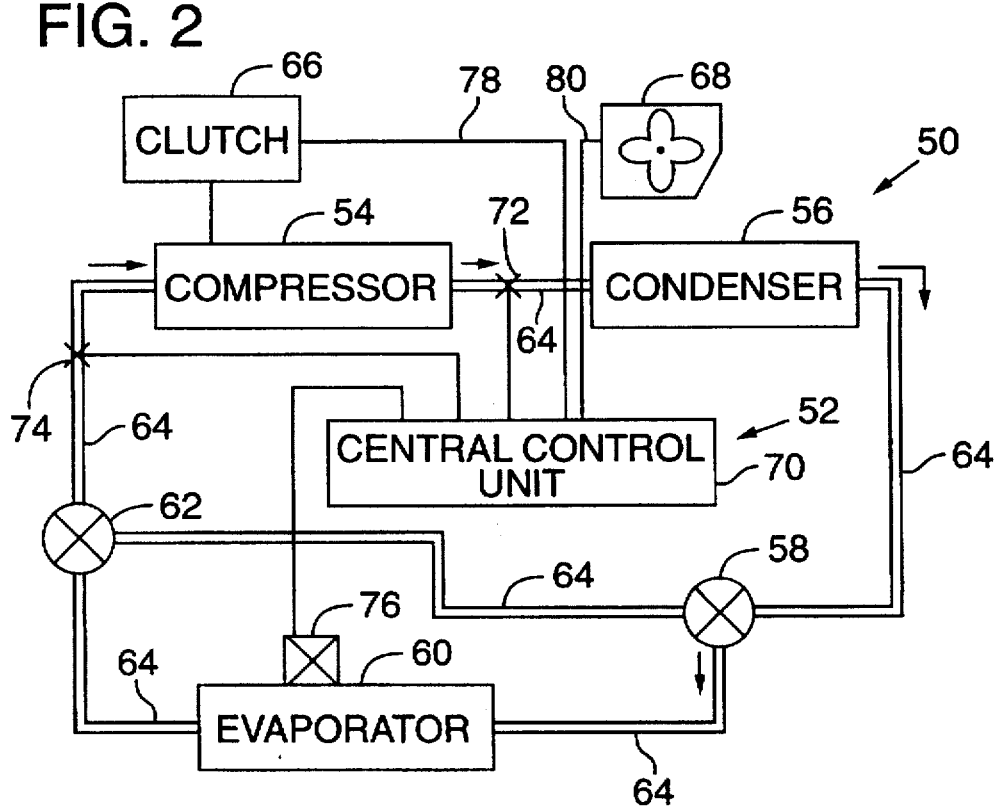
FIG. 2 is a simplified block diagram of a commercial vehicle air conditioning system with an integrated controller of the present invention.

FIG. 2 is a simplified block diagram of a conventional commercial vehicle air conditioning system 50 with an integrated controller 52 of the present invention. Air conditioning system 50 is substantially similar to air conditioning system 10 shown in FIG. 1 and includes a compressor 54 that pumps under relatively high pressure and temperature a refrigerant gas toward a condenser 56 that dissipates heat in the refrigerant gas and converts it to liquid phase. Low-temperature liquid refrigerant passes through a first control valve 58 (e.g., a thermostatic expansion valve) that controls the flow of refrigerant to an evaporator 60 that cools, dries, and typically cleans the air entering an operator compartment (not shown). Low pressure, low temperature refrigerant gas passes from evaporator 60 through a second control valve 62 (e.g., a suction throttling valve) and returns to compressor 54.

The refrigerant is carried through air conditioning system 50 via tubes 64. Compressor 54 includes a clutch 66 for selectively engaging a fan belt (not shown) to drive compressor 54. A cooling fan 68 is positioned adjacent condenser 56 to improve the dissipation of heat in the refrigerant.

In a preferred embodiment, integrated controller 52 includes a central control unit 70 that receives status information about air conditioning system 50 from a high pressure switch 72 coupled to tube 64 between compressor 54 and condenser 56, a low pressure switch 74 coupled to tube 64 between control valve 62 and compressor 54, and an evaporator thermostat 76 coupled to evaporator 60. Central control unit 70 includes a clutch drive controller output 78 for controlling compressor clutch 66 and a fan control output 80 for controlling condenser fan 68.

Figure 3:
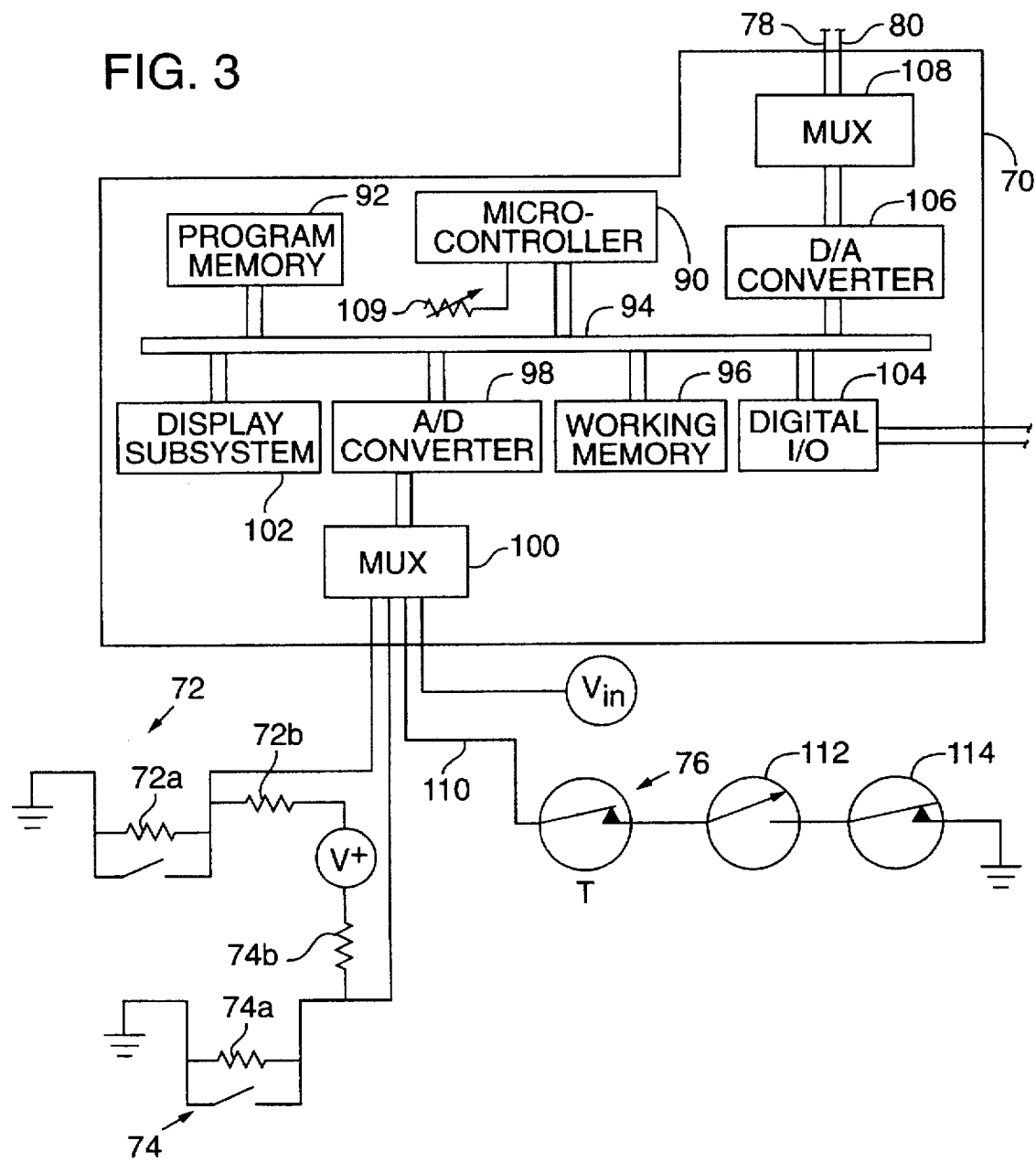
FIG. 3 is a combined schematic and block diagram of an integrated controller of the present invention.

Referring to FIG. 3, central control unit 70 includes a microcontroller 90 that controls integrated controller 52 according to program instructions stored in a program memory 92 (e.g., an EPROM). Microcontroller 90 may have an eight-bit configuration and may be a model PIC16C71 manufactured by Microchip of Chandler, Ariz. Microcontroller 90 and program memory 92 communicate via a communication bus 94 with a system working memory 96, which preferably includes a nonvolatile memory component such as EEPROM, an analog-to-digital converter 98 that receives selected analog signals from a four-channel input multiplexer 100, a display subsystem 102, a digital input/output port 104, and a digital-to-analog converter 106 coupled to an output multiplexer 108 for delivering control signals to clutch drive controller output 78 and fan control output 80.

A thermistor bridge 109 provides microcontroller 90 a signal representing the ambient temperature. Various interfacing, power, and clock connections and components that are not shown would be included in central control unit 70. Persons skilled in the art would be capable of implementing such connections and components while recognizing the unique features of the present invention. Preferably, integrated controller 52 receives power from the vehicle ignition circuit.

High pressure switch 72 is preferably a Model PM-700 high pressure switch available from Index Industries, Inc. of Redmond, Wash., the assignee of the present application. Switch 72 includes a resistor 72a, of for example 2.49 kilohms, connected in parallel between the switch contacts to allow diagnosing of wiring or connector faults in switch 72. High pressure switch 72 is connected between ground and an input resistor 72b, of for example 680 ohms, connected to the vehicle electric power source. Resistors 72a and 72b form a voltage divider that is connected to an input of multiplexer 100.

High pressure switch 72 is normally open when pressure within corresponding tube 64 is below a predetermined lower high pressure threshold (e.g., 260 psi). High pressure switch 72 closes when pressure in corresponding tube 64 exceeds an upper high pressure threshold (e.g., 300 psi). As described below in greater detail, high pressure switch 72 functions as a primary control of condenser fan 68, according to processing rules stored in central control unit 70. It will be appreciated that the specific pressure thresholds for high pressure switch 72 will vary according to specific operating conditions of different commercial vehicle air conditioning systems.

Low pressure switch 74 is preferably a Model PM-700 low pressure switch available from Index Industries, Inc. of Redmond, Wash., the assignee of the present application. Switch 74 includes a resistor 74a, of for example 2.49 kilohms, connected in parallel between the switch contacts to allow diagnosing of wiring or connector faults in switch 74. Low pressure switch 74 is connected between ground and an input resistor 74b, of for example 680 ohms, connected to the vehicle electric power source. Resistors 74a and 74b form a voltage divider that is connected to an input of multiplexer 100.

Low pressure switch 74 is normally open when pressure within corresponding tube 64 is below a predetermined lower low pressure threshold (e.g., 10 psi). Low pressure switch 74 closes when pressure in corresponding tube 64 exceeds an upper low pressure threshold (e.g., 34 psi). As described below in greater detail, low pressure switch 74 functions as a primary detector of refrigerant charge loss and to prevent operation of air conditioning system 50 in excessively low ambient temperatures, according to processing rules stored in central control unit 70. It will be appreciated that the specific pressure thresholds for low pressure switch 74 will vary according to specific operating conditions of different commercial vehicle air conditioning systems.

Pressure switches 72 and 74 are connected to multiplexer inputs 110, which receive switch voltages corresponding to the resistances across the switches 72 and 74. Multiplexer 100 selectively delivers one at a time the switch voltages for pressure switches 72 and 74 to analog-to-digital converter 98, which generates corresponding digital voltage values. Microcontroller 90 receives the digital voltage values and determines from them the status of each of switches 72 and 74.

For example, a first digital voltage value corresponding to a low level resistance (e.g., 0–97 ohms) indicates that the corresponding one of switches 72 and 74 is operable and closed. A second digital voltage value corresponding to a mid-low level resistance (e.g., 98–227 ohms) indicates a fault in the corresponding one of switches 72 and 74. The fault under such circumstances typically corresponds to a partial short across the switch due to, for example, moisture intrusion or an unseated contact.

A third digital voltage value corresponding to a mid-high level resistance (e.g., 227 ohms-4.77 kohms) indicates that the corresponding one of switches 72 and 74 is operable and open. A fourth digital voltage value corresponding to a high level resistance (e.g., more than 4.77 kohms) indicates a fault in the corresponding one of switches 72 and 74. The fault under such circumstances typically corresponds to a break in the circuit to which corresponding switch 72 or 74 is connected.

It will be appreciated that the self-diagnostic features of pressure switches 72 and 74 enhance the reliability and overall diagnostic capability of integrated controller 52. In addition to pressure switches 72 and 74, evaporator thermostat 76 is connected in series between an input 110 of multiplexer 100 a main power switch 112 for air conditioning system 50 and an operator compartment thermostat 114. Evaporator thermostat 76 switches closed for temperatures greater than a predetermined upper threshold temperature (e.g., about 38° F.) and switches open for temperatures less than a predetermined lower threshold temperature (e.g., about 32° F.). As described below in greater detail, evaporator thermostat 76 functions as a primary control of compressor 54 to prevent formation of frost on evaporator 60. It will be appreciated that the specific temperature thresholds for evaporator thermostat 76 will vary according to specific operating conditions of different commercial vehicle air conditioning systems.

Figure 4:
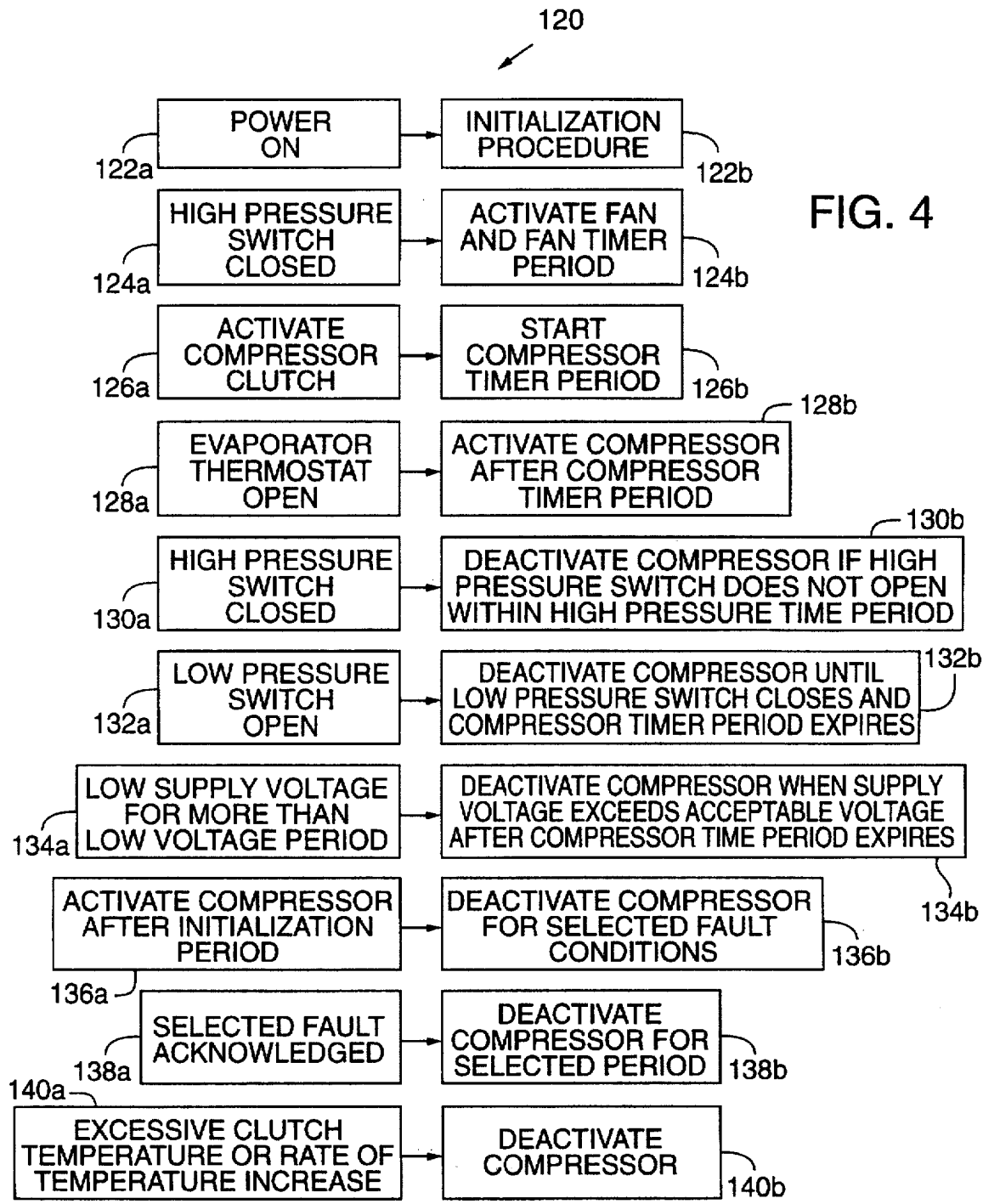
FIG. 4 is a state diagram representing a method of controlling a commercial vehicle air conditioning system according to the present invention.

FIG. 4 is a state diagram representing a first preferred process 120 by which integrated controller 52 controls commercial vehicle air conditioning system 50. State block 122a indicates that system power is applied to integrated controller 52, preferably upon engaging the ignition switch of the commercial vehicle within which integrated controller 52 is used. Responsive state block 122b indicates that central control unit 70 performs within a predetermined initialization period (e.g., 15 seconds) selected system control functions and allows selective initiation of certain subroutines, which are described below in greater detail. The control functions performed by central control unit 70 preferably include reading a voltage from thermistor bridge 109 to determine the ambient temperature and reading the nonvolatile memory component of system working memory 96 to determine system diagnostics status.

Air conditioning system 50 is not activated during the initialization period to maintain the system in its quiescent state while central control unit 70 conducts its control functions. Inputs to central control unit 70 are successively sampled and filtered substantially continuously and changes in the states of the input are preferably identified multiple times (e.g., 4 or 5) before being acknowledged and acted upon. Deferring acknowledgement of a state change increases system accuracy by minimizing process steps in response to spurious signals. The following state blocks represent operations of process 120 that preferably occur after the predetermined initialization period.

State block 124a indicates that high pressure switch 72 is acknowledged as closed, which occurs when pressure in corresponding tube 64 exceeds the upper high pressure threshold. Responsive state block 124b indicates that condenser fan 68 is activated and a programmable fan timer period is started or restarted. Condenser fan 68 is deactivated after expiry of the predetermined fan timer period following an acknowledged closure of high pressure switch 72. State blocks 124a and 124b represent a preferred control rule for condenser fan 68.

State block 126a indicates that central control unit 70 delivers an activation signal for compressor clutch 66 to clutch drive controller output 78. State block 126b indicates that a predetermined compressor timer period is started in response to activation of compressor clutch 66. Compressor clutch 66 may be deactivated during the predetermined compressor timer period, but may not be reactivated until expiry of the predetermined compressor timer period.

State block 128a indicates that evaporator thermostat 76 is acknowledged as open and corresponds to a temperature less than the predetermined lower threshold temperature. State block 128b indicates that compressor 54 is deactivated while evaporator thermostat 76 is open. Compressor 54 is reactivated when evaporator thermostat 76 closes and the compressor timer period expires.

State block 130a indicates that high pressure switch 72 is acknowledged as closed. Responsive state block 130b indicates that a high pressure time period is started and a high pressure fault timer is started, but not restarted. If high pressure switch 72 does not open before expiry of the high pressure time period, central control unit 70 delivers a deactivation signal to clutch drive controller output 78 for deactivating compressor 54. Compressor 54 is reactivated after high pressure switch 72 opens and the predetermined compressor time period expires. Use of high pressure fault timer is described below.

State block 132a indicates that low pressure switch 74 is acknowledged as open, which corresponds to a pressure of less than the predetermined lower low pressure threshold. Responsive state block 132b indicates that compressor 54 is deactivated. Compressor 54 is reactivated after low pressure switch 74 closes and the predetermined compressor time period expires.

State block 134a indicates that the system supply voltage supplied to central control unit 70 by the commercial vehicle is less than a programmable predetermined lower threshold voltage for more than a programmable predetermined low voltage period. Responsive state block 134b indicates that compressor 54 is deactivated. Compressor 54 is reactivated after the system supply voltage exceeds a programmable predetermined acceptable voltage and the predetermined compressor time period expires. The predetermined acceptable voltage is greater than the predetermined lower threshold voltage by a selected difference (e.g., 2 volts) to limit cycling of compressor clutch 66. An inadequate voltage difference between the predetermined acceptable voltage and the predetermined lower threshold voltage results in excessive cycling of clutch 66 because activation of compressor 54 can cause a system voltage decrease that would immediately deactivate compressor 54. A suitable predetermined acceptable voltage can be determined by measuring the typical voltage drop that occurs upon activation of compressor 54 and adding to the typical voltage drop a small buffer voltage.

State block 136a indicates that immediately after the predetermined initialization period described in state blocks 122a and 122b, compressor 54 is activated for a programmable predetermined thermostat override period (e.g., 15 seconds) regardless of the state of evaporator thermostat 76. This allows operation and lubrication of air conditioning system 50 with each ignition cycle of the commercial vehicle. State block 136b indicates that compressor 54 is deactivated if high pressure switch 72 closes or is closed, if low pressure switch 74 opens or is open, if the system operating voltage is less than the predetermined lower threshold voltage, or if a fault in one of pressure switches 72 and 74 is acknowledged. Compressor 54 remains deactivated until expiry of the predetermined thermostat override period.

State block 138a indicates that at least one of selected predetermined faults are acknowledged. State block 138b indicates that compressor 54 is deactivated until the next activation of integrated controller 52. State blocks 126–138 represent preferred control rules for compressor 54. It will be appreciated that such control rules are exemplary of the integrated operation of controller 52 in contrast to conventional independent controller components.

State block 140a indicates that a sensed temperature of clutch 66 exceeds a programmable predetermined clutch temperature (e.g., 250° F.) or is increasing at a rate that exceeds a programmable predetermined rate of temperature change (e.g., 5° F./second). Responsive state block 140b indicates that compressor 54 is deactivated.

Preferably, the sensed temperature of clutch 66 is measured without use of a separate temperature sensor applied thereto. The sensed temperature is measured by applying a test current to the coil for controlling clutch 66 and sensing the resulting voltage drop across it. The coil would typically be formed of copper wiring, which has a relatively large, known temperature coefficient. The resistance of copper increases as its temperature rises.

A baseline value for the coil resistance is determined from ambient temperature information provided by thermistor bridge 109 and information regarding operation of the vehicle engine and compressor 54. The value of the baseline coil resistance is stored in the nonvolatile memory component of system working memory 96. The programmable predetermined clutch temperature and the programmable predetermined rate of temperature change can be selected relative to the baseline coil resistance.

Figure 5:
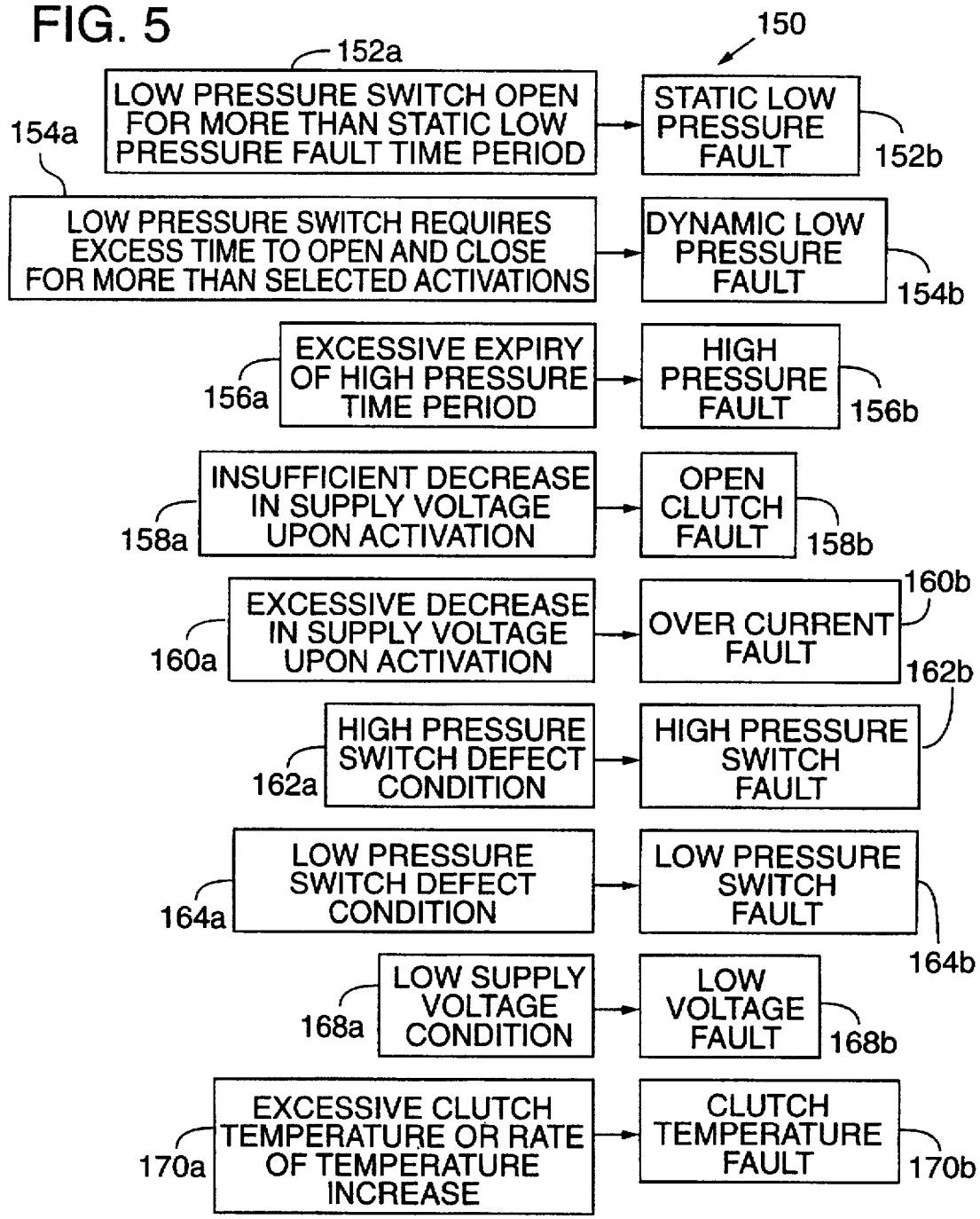
FIG. 5 is a state diagram representing a method of detecting and identifying predetermined faults in a commercial vehicle air conditioning system according to the present invention.

FIG. 5 is a state diagram representing a second preferred process 150 by which integrated controller 52 identifies selected fault conditions in air conditioning system 50 and obtains diagnostic information regarding the selected fault conditions. Process 150 allows integrated controller 52 to interrupt operation of air conditioning system 50 in response to operating faults that include a static low refrigerant pressure that corresponds to a complete loss of refrigerant charge, a dynamic low refrigerant pressure that corresponds to a partial loss of charge, high refrigerant pressure that corresponds to a refrigerant overcharge, an open clutch circuit condition, a shorted clutch circuit condition, or a low battery voltage condition. Interrupting operation of air conditioning system 50 upon early detection of such fault conditions prevents severe damage of air conditioning system 50.

State block 152a indicates that low pressure switch 74 remains open for more than a programmable predetermined static low pressure fault time period (e.g., 180 seconds) and the ambient temperature identified by thermistor bridge 109 is greater than a programmable predetermined low pressure fault threshold temperature (e.g., 45° F.). Responsive state block 152b indicates that a static low pressure fault corresponding to a substantially complete loss of refrigerant is acknowledged.

State block 154a indicates that upon activation of compressor 54, low pressure switch 74 requires more than a programmable predetermined low pressure cycle time period (e.g., 9 seconds) to open and then close for more than a programmable predetermined number of consecutive activations of compressor 54. Responsive state block 154b indicates acknowledgement of a dynamic low pressure fault characterized by relatively rapid cycling of low pressure switch 74. This fault is symptomatic of a partial loss of refrigerant.

State block 156a indicates that the high pressure time period referred to in responsive state block 130b expires more than a programmable predetermined number of times during a predetermined duration of the high pressure fault timer described in responsive state block 130b. Responsive state block 156b indicates that a high pressure fault is acknowledged. The high pressure fault is characterized by excessive deactivation of compressor 54 after condenser fan 68 is activated. This fault can be caused by, for example, failure of condenser fan 68, foreign material in expansion valve 58, or refrigerant overcharging.

State block 158a indicates that the current flowing to the coil for controlling clutch 66 is not greater than a predetermined minimum threshold current (e.g., 500 mA) upon a predetermined number (e.g., two) of consecutive activations of compressor 54. Responsive state block 158b indicates acknowledgement of an open clutch fault. This fault represents an open connection to the coil for controlling clutch 66 for compressor 54.

State block 160a indicates that the current flowing to the coil for controlling clutch 66 is greater than a predetermined maximum threshold current (e.g., 7 amps) upon a predetermined number (e.g., two) of consecutive activations of compressor 54. Responsive state block 160b indicates acknowledgement of an overcurrent fault. This fault represents a short in the coil for controlling clutch 66 for compressor 54 or a poor power supply coupling to central control unit 70.

State block 162a indicates that high pressure switch 72 has a resistance corresponding to a sensor fault condition for more than a predetermined settling period (e.g., 0.5 second). Responsive state block 162b indicates that a high pressure switch open fault is acknowledged. This fault indicates that the wiring to high pressure switch 72 is defective or there is a parasitic leakage current across switch 72. Causes of this fault can include an unseated connector, a break in a wiring connection or harness, or moisture intrusion into the connectors or switch 72.

State block 164a indicates that low pressure switch 74 has a resistance corresponding to a sensor fault condition for more than a predetermined settling period (e.g., 0.5 second). Responsive state block 164b indicates that a low pressure switch open fault is acknowledged. This fault indicates that the wiring to low pressure switch 72 is defective or there is a parasitic leakage current across the switch. Causes of this fault can include an unseated connector, a break in a wiring connection or harness, or moisture intrusion into the connectors or switch 74.

State block 168a indicates that air conditioning system 50 is activated and the system supply voltage is less than a programmable predetermined minimum battery threshold (e.g., 11 volts), or air conditioning system 50 is not activated and the system supply voltage is less than the programmable predetermined acceptable voltage for more than the programmable predetermined low voltage period, as described with reference to state blocks 134a and 134b. Responsive state block 168b indicates that a low voltage fault is acknowledged so long as either of the low system operating voltage conditions exists.

State block 170a indicates that a periodically sensed temperature of clutch 66 exceeds a programmable predetermined clutch temperature (e.g., 250°F.) or is increasing at a rate that exceeds a programmable predetermined rate of temperature change (e.g., 5° F./second). Responsive state block 170b indicates that a clutch temperature fault is acknowledged. This fault is symptomatic of slippage of clutch 66 or its drive belt.

The major system faults described in FIG. 5 preferably are included in the selected predetermined faults in response to which compressor 54 is deactivated according to responsive state block 138b. These major system faults are displayed by display subsystem 102 to simplify diagnosis and correction of the faults. In a preferred embodiment, display subsystem 102 is extremely simple to enhance the reliability and minimize the cost of integrated controller 52. For example, one red light-emitting diode and one green light-emitting diode can identify the fault conditions as set forth in Table 1 below.

FAULT CODE TABLE

| Priority Number | Fault Code Name | Fault Description | Red LED Blinks |
|---|---|---|---|
| 1 | Static Low Pressure | Full Loss of Charge | 1 |
| 2 | Dynamic Low Pressure | Partial Loss of Charge | 1 |
| 3 | High Pressure | Overcharge | 2 |
| 4 | Open Clutch | Clutch Wire Open | 3 |
| 5 | Over-current | Shorted Clutch Coil | 3 |
| 6 | Low P Switch Open | Low P Switch Failure | 4 |
| 7 | High P Switch Open | High P Switch Failure | 4 |
| 8 | Low Voltage | Low Battery Supply Voltage | Rapid Green Blinks |
| 9 | No Faults | No Faults-System Functional | Slow Green Blinks |

Preferably, a "blink" as referred to in the Fault Code Table is a brief activation of an LED, such as for a period of about 0.25 seconds. The multiple blinks of a particular fault display are each separated by a brief period (e.g., 0.5 second), and the fault display is repeated after a longer delay period (e.g., 2 seconds).

Another aspect of the present invention is that central control unit 70 is capable of obtaining and storing in the nonvolatile memory component of system working memory 96 data concerning a variety of conditions and operations of air conditioning system 50 and integrated controller 52. This data can aid in scheduling of maintenance for air conditioning system 50 and diagnosing of system faults. Data that are obtained and stored in the nonvolatile memory component of system working memory 96 include the maximum and minimum ambient temperatures sensed by thermistor bridge 109, a cumulative total count of activations of compressor 54, a cumulative total of the operating time of air conditioning system 50, cumulative total counts of the cycling of high pressure switch 72, low pressure switch 74, evaporator thermostat 76, and activations of condenser fan 68, cumulative total operating time of integrated controller 52, and a cumulative total count of cycles of low pressure switch 74 occurring over periods of less than the predetermined minimum threshold period for identifying dynamic low pressure faults. It will be appreciated that other system and fault information could also be obtained and stored.

As described above with reference to responsive state block 122b, central control unit 70 allows selective initiation of certain subroutines during the predetermined initialization period. Preferably, the subroutines that can be performed by central control unit 70 include a system program subroutine, an interrogation subroutine, and a time base calibration subroutine. In accordance with each of these subroutines, central control unit 70 communicates via digital input/output port 104 with a conventional personal computer executing a compatible computer software program or with a standard vehicular databus such as a SAEJ1587/1708 bus system.

The system programming subroutine allows selective programming of each of the variables described above with reference to FIGS. 4 and 5 as being programmable. This allows various operating conditions to be selected according to the circumstances of a particular air conditioning system 50 and its usage. It will be appreciated that other variables, values or limits could also or alternatively be programmable. For example, the deactivation period for compressor 54 described in responsive state block 138b could be programmed differently.

The interrogation subroutine allows transfer of data, such as system operating data stored in the nonvolatile memory component of system working memory 96, to be transferred to a personal computer or to a vehicular computer via a standard vehicular databus to aid in scheduling of maintenance or diagnosis of a system fault. The time base calibration subroutine applies a square-wave signal to be applied to fan control output 80 for timed activation of condenser fan 68 to aid in calculation of compensation factors for correcting any errors in timing information held in or used by central control unit 70. In a preferred embodiment, the subroutines may be activated by applying to pressure switches 72 and 74 an input resistance within a predetermined range. This predetermined resistance is applied by 470 ohms. These system subroutines are preferably terminated by deactivating integrated controller 52.

Integrated controller 52 has been described with reference to a pair of pressure switches 72 and 74 that provide substantially binary information regarding the refrigerant pressure within the corresponding tubes 64. Pressure switches 72 and 74 are desirable because they are highly reliable, relatively inexpensive, and similar to components typically used in commercial vehicle air conditioning systems. It will be appreciated, however, that the present invention could be implemented in a manner in which pressure switches 72 and 74 are replaced with pressure transducers that provide a range of refrigerant pressure values to central control unit 70. Such pressure transducers could enable central control unit 70 to provide enhanced diagnostic and control operations for air conditioning system 50.

It will be clear to those having skill in the art that many changes may be made to the details of the above-described embodiment of this invention without departing from the underlying principles thereof. The scope of the present invention should be determined, therefore, only by the following claims.

We claim:

1. An integrated controller for a commercial vehicle air conditioning system having a compressor that pumps a fluid refrigerant through a condenser, an evaporator, a high-pressure section, and a low-pressure section, the condenser having an associated condenser cooling fan and the compressor including a clutch system for selectively activating the compressor, comprising:

central control means for controlling the commercial vehicle air conditioning system, the central control means including timing means for determining the temporal relationships among input signals received from components of the air conditioning system, the temporal relationships being used to determine appropriate control signals;

a high-pressure sensor coupled to the high-pressure section of the air conditioning system and in communication with the central control means;

a low-pressure sensor coupled to the low-pressure section of the air conditioning system and in communication with the central control means;

a temperature sensor coupled to the evaporator and in communication with the central control means; and control outputs coupling the central control means with the condenser cooling fan and the compressor clutch system, wherein the central control means receives and analyzes information from the high-pressure sensor, the low-pressure sensor, and the temperature sensor coupled to the evaporator and provides on the control outputs appropriate control signals to the cooling fan and the compressor clutch system, thereby improving the reliability of the commercial vehicle air conditioning system.

2. The integrated controller of claim 1 further comprising an ambient temperature sensor in communication with the central control means for providing to it ambient temperature information.

3. The integrated controller of claim 1 in which the high pressure sensor or the low pressure sensor comprises a pressure transducer.

4. The integrated controller of claim 1 in which the high pressure sensor or the low pressure sensor comprises a binary pressure switch.

5. The integrated controller of claim 1 in which the temperature sensor comprises a thermostat.

6. The integrated controller of claim 1 in which the central control means includes a non-volatile memory for storing information related to the operating conditions of the air conditioning system.

7. The integrated controller of claim 6 in which the information comprises program instructions.

8. The integrated controller of claim 6 in which the information comprises information from sensors.

9. The integrated controller of claim 1 in which the central control means includes a microcontroller.

10. The integrated controller of claim 9 in which the central control means includes a multiplexer for receiving signals from the high-pressure sensor, the low-pressure sensor, and the temperature sensor coupled to the evaporator and an analog-to-digital converter receiving analog signals from the multiplex and presenting digital signals to the microcontroller.

11. The integrated controller of claim 9 in which the central control means includes a digital-to-analog converter for converting digital output from the microcontroller into analog control signals for application to the control outputs.

12. The integrated controller of claim 1 further comprising a display for indicating a status of the vehicle air conditioning system, the status being determined by the central control unit in response to information received from the high-pressure sensor, the low-pressure sensor, and the temperature sensor coupled to the evaporator.

13. The integrated controller of claim 1 in which the central control means includes means for determining whether a second input signal indicating a normal operating condition occurs within a predetermined time period from the occurrence of a first input signal indicating an abnormal operating condition, the central control means maintaining activation of the compressor if the second signal occurs within the predetermined time period after the first signal and deactivating the compressor if the second signal does not occur within the predetermined time period after the first signal.

14. The integrated controller of claim 1 in which the central control means includes means for determining whether an input signal from a sensor that would cause activation of the compressor clutch occurs within a predetermined time period after the compressor clutch was engaged and reactivating the compressor only after expiration of the predetermined time period.

15. The integrated controller of claim 1 in which central control means deactivates the compressor clutch when the low pressure switch requires more than a predetermined low pressure cycle time period to open and then close for more than a predetermined number of consecutive compressor clutch activations.

16. A method for improving the reliability of a commercial vehicle air conditioning system having a compressor that pumps a fluid refrigerant through a condenser and an evaporator, the condenser having an associated condenser cooling fan, the compressor including a clutch system for selectively activating the compressor, the commercial vehicle air conditioning system further having a central control unit and system components including a high-pressure sensor, a low-pressure sensor, and a thermostat coupled to an evaporator, the method comprising:

sensing pressure at the high-pressure sensor and transmitting high-pressure information to the central control unit;

sensing pressure at the low-pressure sensor and transmitting low-pressure information to the central control unit;

sensing temperature information at the evaporator and transmitting evaporator temperature information to the central control unit;

comparing the high-pressure information, the low-pressure information and the evaporator temperature information with stored information to determine a status of the vehicle air conditioning system including determining whether the duration of a high-pressure reading exceeds that of a predetermined high-pressure fault time period; and transmitting control signals consistent with the status of the air conditioning system to the compressor clutch system fan to control its operation, including transmitting when the duration of the high-pressure reading exceeds that of the predetermined high-pressure fault time period a control signal to deactivate the compressor.

17. The method of claim 16 in which sensing pressure at the high pressure sensor and sensing pressure at the low pressure sensor include sensing pressures using a high pressure binary switch and a low pressure binary switch, respectively, the binary switches changing states independently of control signals from a centralized controller.

18. The method of claim 16 in which the commercial vehicle has a system voltage, the method further comprising sensing the system voltage, and in which transmitting control signals includes transmitting a control signal to deactivate the compressor clutch when the system voltage is below a predetermined level.

19. An integrated controller for a commercial vehicle air conditioning system having a compressor that pumps a fluid refrigerant through a condenser, an evaporator, a high-pressure section, and a low-pressure section, the condenser having an associated condenser cooling fan and the compressor including a clutch system for selectively activating the compressor, comprising:

central control means for controlling the commercial vehicle air conditioning system;

a high-pressure sensor coupled to the high-pressure section of the air conditioning system and in communication with the central control means;

a low-pressure sensor coupled to the low-pressure section of the air conditioning system and in communication with the central control means;

a temperature sensor coupled to the evaporator and in communication with the central control means; and control outputs coupling the central control means with the condenser cooling fan and the compressor clutch system;

wherein the central control means includes a memory storing information that specifies appropriate control signals to be placed on the control outputs in response to information received from the high-pressure sensor, the low-pressure sensor, and the temperature sensor coupled to the evaporator and wherein the central control means receives and analyzes in accordance with the information stored in the memory information from the high-pressure sensor, the low-pressure sensor, and the temperature sensor coupled to the evaporator, and provides on the control outputs appropriate control signals to the cooling fan and the compressor clutch system, thereby improving the reliability of the commercial vehicle air conditioning system.

20. The integrated controller of claim 19 in which the memory stores program instructions and in which the information received from the high-pressure sensor, the low-pressure sensor, and the temperature sensor coupled to the evaporator is information stored in a non-volatile system working memory.

21. An integrated controller for a commercial vehicle air conditioning system having a compressor that pumps a fluid refrigerant through a condenser, an evaporator, a high-pressure section, and a low-pressure section, the condenser having an associated condenser cooling fan and the compressor including a clutch system having a clutch for selectively activating the compressor, comprising:

central control means for controlling the commercial vehicle air conditioning system;

a high-pressure sensor coupled to the high-pressure section of the air conditioning system and in communication with the central control means;

a low-pressure sensor coupled to the low-pressure section of the air conditioning system and in communication with the central control means;

a temperature sensor coupled to the evaporator and in communication with the central control means;

a clutch temperature sensor for sensing the temperature of the clutch; and control outputs coupling the central control means with the condenser cooling fan and the compressor clutch system, wherein the central control means receives and analyzes information from the high-pressure sensor, the low-pressure sensor, the temperature sensor coupled to the evaporator, and the clutch temperature sensor and provides on the control outputs appropriate control signals to the cooling fan and the compressor clutch system, thereby improving the reliability of the commercial vehicle air conditioning system.

22. The integrated controller of claim 21 in which the clutch temperature sensor senses the clutch temperature by measuring a voltage drop across a coil used for controlling clutch operation.

23. The integrated controller of claim 21 in which the commercial vehicle has a system voltage and further comprising means for sensing the system voltage, wherein the central control means provides on the control outputs a control signal deactivating the compressor clutch if the system voltage is below a predetermined voltage.

24. The integrated controller of claim 23 further comprising means for reactivating the compressor clutch when the system voltage exceeds the predetermined voltage by a predetermined non-zero amount sufficient to prevent frequent activating and deactivating of the compressor clutch.

25. A method for improving the reliability of a commercial vehicle air conditioning system having a compressor that pumps a fluid refrigerant through a condenser and an evaporator, the condenser having an associated condenser cooling fan, the compressor including a clutch system for selectively activating the compressor, the commercial vehicle air conditioning system further having a central control unit and system components including a high-pressure sensor, a low-pressure sensor, and a thermostat coupled to an evaporator, the method comprising:

sensing pressure at the high-pressure sensor and transmitting high-pressure information to the central control unit;

sensing pressure at the low-pressure sensor and transmitting low-pressure information to the central control unit;

sensing temperature information at the evaporator and transmitting evaporator temperature information to the central control unit;

comparing the high-pressure information, the low-pressure information and the evaporator temperature information with stored information to determine a status of the vehicle air conditioning system including determining whether the duration of a low-pressure reading exceeds that of a predetermined low-pressure fault time period; and transmitting control signals consistent with the status of the air conditioning system to the compressor clutch system to control its operation including transmitting when the duration of the low-pressure reading exceeds that of the predetermined low-pressure fault time period a control signal to deactivate the compressor.

26. The method of claim 25 in which the commercial vehicle has a system voltage, the method further comprising sensing the system voltage, and in which transmitting control signals includes transmitting a control signal to deactivate the compressor clutch when the system voltage is below a predetermined level.

27. The method of claim 26 further comprising reactivating the compressor clutch when the system voltage exceeds the predetermined voltage by a predetermined non-zero amount, thereby reducing cycling of the compressor clutch.

28. The method of claim 25 further comprising initiating a start-up routine upon power being supplied to the central control unit, the start-up routine including reading a voltage from a thermistor bridge to determine the ambient temperature.

29. The method of claim 25 further comprising initiating a start-up routine upon power being supplied to the central control unit, the start-up routine including reading information from a memory to determine a system diagnostics status.

30. The method of claim 29 in which the start-up further comprises activating the compressor if the diagnostic status fails to indicate a fault condition that could damage the compressor.

31. The method of claim 25 in which the commercial vehicle includes an ignition switch, the method further comprising activating the compressor without regard to the evaporator temperature information upon switching on the ignition switch, thereby lubricating the compressor.

32. The method of claim 31 in which the compressor is activated for a predetermined period of time to lubricate the compressor.

33. An integrated controller for a commercial vehicle air conditioning system having a compressor that pumps a fluid refrigerant through a condenser, an evaporator, a high-pressure section and a low-pressure section, the condenser having an associated condenser cooling fan and the compressor including a clutch system for selectively activating the compressor, comprising:

central control means for controlling the commercial vehicle air conditioning system;

a high-pressure sensor coupled to the high-pressure section of the air conditioning system and in communication with the central control means;

a low-pressure sensor coupled to the low-pressure section of the air conditioning system and in communication with the central control means, the high-pressure sensor, the low-pressure sensor, or both the high-pressure sensor and low-pressure sensor including binary pressure switch or switches each switch operating independently of the central control means and providing information with regard to its status to the central control means;

a temperature sensor coupled to the evaporator and in communication with the central control means; and control outputs coupling the central control means with the condenser cooling fan and the compressor clutch system, wherein the central control means receives and analyzes information from the high-pressure sensor, the low-pressure sensor, and the temperature sensor coupled to the evaporator and provides on the control outputs appropriate control signals to the cooling fan and the compressor clutch system, thereby improving the reliability of the commercial vehicle air conditioning system.

34. An integrated controller for a commercial vehicle air conditioning system having a compressor that pumps a fluid refrigerant through a condenser, an evaporator, a high-pressure section and a low-pressure section, the condenser having an associated condenser cooling fan and the compressor including a clutch system for selectively activating the compressor, comprising:

central control means for controlling the commercial vehicle air conditioning system;

a high-pressure sensor coupled to the high-pressure section of the air conditioning system and in communication with the central control means;

a low-pressure sensor coupled to the low-pressure section of the air conditioning system and in communication with the central control means;

a temperature sensor coupled to the evaporator and in communication with the central control means;

a digital input-output port for providing digital information about the commercial vehicle air conditioning system, including information from at least one of the high-pressure sensor, the low-pressure sensor, or the temperature sensor, from the central control means to an outside computer; and control outputs coupling the central control means with the condenser cooling fan and the compressor clutch system, wherein the central control means receives and analyzes information from the high-pressure sensor, the low-pressure sensor, and the temperature sensor coupled to the evaporator and provides on the control outputs appropriate control signals to the cooling fan and the compressor clutch system, thereby improving the reliability of the commercial vehicle air conditioning system.

35. The integrated controller of claim 34 in which the central control means includes a reprogrammable memory and in which the digital input-output port includes means for providing information from an external computer to reprogram the reprogrammable memory.

36. A method for improving the reliability of a commercial vehicle air conditioning system having a compressor that pumps a fluid refrigerant through a condenser and an evaporator, the condenser having an associated condenser cooling fan, the compressor including a clutch system for selectively activating the compressor, the commercial vehicle air conditioning system further having a central control unit and system components including a high-pressure sensor, a low-pressure sensor, and a thermostat coupled to an evaporator, the method comprising:

sensing pressure at the high-pressure sensor and transmitting high-pressure information to the central control unit;

sensing pressure at the low-pressure sensor and transmitting low-pressure information to the central control unit, wherein sensing pressure at the high-pressure sensor and sensing pressure at the low-pressure sensor include sensing pressures using a high-pressure binary switch and a low-pressure binary switch, respectively, the binary pressure switches being of the self-diagnosing type and changing states independently of control signals from a centralized controller;

sensing temperature information at the evaporator and transmitting evaporator temperature information to the central control unit;

comparing the high-pressure, low-pressure, and evaporator temperature information with stored information to determine a status of the vehicle air conditioning system; and transmitting control signals consistent with the status of the air conditioning system to the compressor clutch system and the condenser cooling fan to control their operation.

37. The method of claim 36 further comprising displaying status information.

38. The method of claim 36 in which the commercial vehicle has a system voltage, the method further comprising sensing the system voltage, and in which transmitting control signals includes transmitting a control signal to deactivate the compressor clutch when the system voltage is below a predetermined level.

39. A method for improving the reliability of a commercial vehicle air conditioning system having a compressor that pumps a fluid refrigerant through a condenser and an evaporator, the condenser having an associated condenser cooling fan, the compressor including a clutch system for selectively activating the compressor system, and the clutch system including a clutch, the commercial vehicle air conditioning system further having a central control unit and system components including a high-pressure sensor, a low-pressure sensor, and a thermostat coupled to an evaporator, the method comprising:

sensing pressure at the high-pressure sensor and transmitting high-pressure information to the central control unit;

sensing pressure at the low-pressure sensor and transmitting low-pressure information to the central control unit;

sensing temperature information at the evaporator and transmitting evaporator temperature information to the central control unit;

sensing a clutch temperature;

comparing the high-pressure information, the low-pressure information, the evaporator temperature information, and the clutch temperature with stored information to determine a status of the vehicle air conditioning system; and transmitting control signals consistent with the status of the air conditioning system to the compressor clutch system and the condenser cooling fan to control their operation, including transmitting a control signal to the clutch system to disengage the clutch when the clutch temperature exceeds a predetermined level.

\* \* \* \* \*